3,481,726
METHODS OF STRENGTHENING INORGANIC ARTICLES BY ION EXCHANGE
Hellmuth G. Fischer, Toledo, and Augustus W. LaDue, Maumee, Ohio, assignors to Owens-Illinois, Inc., a corporation of Ohio
No Drawing. Filed Oct. 23, 1965, Ser. No. 504,159
Int. Cl. C03c 21/00
U.S. Cl. 65—30                6 Claims

ABSTRACT OF THE DISCLOSURE

Processes of strengthening inorganic articles that are glasses or glass-ceramics by exchanging an alkali metal ion in the article with a different alkali metal ion using a low melting alkali metal salt of an organic acid such as sodium acetate and a low melting, low volatile nonpolar hydrocarbon organic vehicle such as paraffinic hydrocarbon oil, at a temperature of about 200 to 550° C. to provide a compressive surface layer on the surface of the article.

---

This invention relates to a process for treating articles of glass, including glass components of articles, to improve the strength of the glass articles and also relates to the articles resulting from the treatment by the process. The present invention especially relates to a process for treating silicate glass composed of silica and alkali metal oxide or oxides, with or without one or more of other compatible constituents such as alkaline earth metal oxides, alumina, zirconia, titania, boron oxide, glass coloring oxides such as oxides of iron, cobalt, nickel, manganese, chromium and vanadium, and fining agents and also especially relates to the silicate glass article resulting from the treatment by the present process.

As used herein, the term "glass" means those inorganic glasses that (1) are not controllably crystallizable, and thus can be divitrified as the term is normally used, to form crystalline material usually in a matrix of a glass having a composition determined by the initial composition and by the composition of the crystalline material; (2) are controllably crystallized by a heat treatment; or (3) have been controllably crystallized by a heat treatment. Glass that is controllably crystallizable is commonly referred to as thermally crystallizable glass composition. A crystallized glass is commonly referred to as a glass-ceramic.

As described later in detail many types of silicate glasses, including glass-ceramics, that contain alkali metal ions have been treated at an elevated temperature by contact with an alkali metal inorganic salt for exchange of alkali ions in a surface portion of the glass with alkali metal ions of the inorganic salt. The usual process is an immersion of the glass in a molten bath of alkali metal inorganic salt or of a mixture of the alkali metal inorganic salt with other inorganic salts. The time of immersion is sufficient to cause this exchange only in a surface layer of the glass article. Lithium ions in a glass have been exchanged alternatively with sodium and potassium ions in molten inorganic salt baths. Sodium ions in glass have been exchanged with lithium and potassium of molten salt baths containing lithium and potassium inorganic salts.

Alkali metal ions have different ionic diameters as can be seen on page 900 of the 3rd edition of Van Nostrand's Scientific Encyclopedia, published in 1958 by D. Van Nostrand Co., Inc., Princeton, N.J. The lithium ion has the smallest ionic diameter. The ionic diameters of the other alkali metal ions are in the order: sodium, potassium, rubidium and cesium, with cesium having the largest ionic diameter.

When a larger alkali metal ion replaces a smaller alkali metal ion in the surface layer of glass at a temperature that is below the strain point of the glass, the surface layer then has a compressional or compressive stress. Apparently the larger ions try to occupy the smaller spaces previously occupied by the smaller alkali metal ions, thereby creating the compressional stress in the surface layer. Because the temperature of the glass is below the strain point, the glass structure cannot readjust itself to relieve the stress.

When a smaller alkali metal ion replaces a larger alkali metal ion in the surface layer of the glass the expansion coefficient of the surface layer will be changed to a lower value than that of the interior part of the glass article and with the result that the surface layer has a compressional stress. This ion exchange can be carried out at a temperature either below the strain point or at a temperature above the strain point but below the softening point of the glass. When the process of ion exchange is carried out below the strain point to replace a larger alkali metal ion in the glass with a smaller alkali metal ion, then the article after the actual exchange is then heated to a temperature sufficiently above the strain point to heal strength-reducing minute cracks occurring during the ion exchange treatment, due to the difference in the expansion coefficients of the interior and the surface layer. Then the stress and the resultant improved strength in the final product will be due to the compositional difference. When there is obtained by the ion exchange a surface layer that has a substantially lower coefficient of expansion than that of the interior glass, the ion exchange is performed as near to, but still below, the strain point as feasible, to avoid the creation of substantial cracks that would not be healed by the latter heating to a temperature above the strain point.

S. S. Kistler in a paper in the Journal of the American Ceramic Society, 45, No. 2, at pages 59–68, and Research Corp. in British Patent No. 917,388 describe an ion exchange process. The British patent mentions the following specific alkali metal inorganic salts that are suitable: $NaNO_3$; $KSCN$; $KNO_3$; $K_2S_2O_7$; $RbNO_3$. These are used in a molten form or as a solution in an organic, nonaqueous ionizing solvent, e.g., acetamide.

U.S. Patent No. 2,771,136 lists various alkali metal salts for use in molten form to ion exchange with alkali metal ions of a glass. Only two of these are the salts of inorganic acids and lithium used alone, i.e., without admixture with other alkali metal salts. These two salts require the use of substantially high temperatures because of their high melting points. The melting points are reduced by mixing such salts with other alkali metal salts or alkaline earth metal salts. Even in such cases, the temperatures that have been used for the ion exchange are still substantially high, presumably due to the high melting points of such mixtures.

These alkali metal salts of inorganic acids can be corrosive at the ion exchange temperature. Furthermore, the melting point can change with a substantial change in the alkali metal composition of the bath due to the ion exchange. In the latter case, when a larger alkali metal ion in the bath is replacing a smaller alkali metal ion in the glass, the melting point of the bath can increase substantially, so that the bath can be used at a temperature just above the melting point of the initial bath composition for only a limited period of time. It is desirable that the ion exchange be carried out with the bath until the alkali metal ion from the glass is no greater than 5% of the alkali metal content on a mole basis; otherwise, the salt bath will become unsuitable for further ion exchange. In view of the high temperatures required to melt some alkali metal inorganic salts they are not suitable for use alone at temperatures below the strain point of many glasses.

It is an object of the present invention to provide a process using an ion exchange medium that can be used at a relatively low temperature alone or in diluted form in which the diluent is liquid at the low temperature without introducing other metal ions.

It is a further object of the invention to provide a process using a material for ion exchanging with glass in which the alkali metal ion content of the medium contacting the glass can be quite low so that the cost of material is less than with materials heretofore used.

Still another object of this invention is to provide a process using an ion exchange medium which is less corrosive than materials heretofore used.

A further object is to provide a process in which ions displaced from the glass can be easily separated from the medium contacting the glass for reuse of the contacting medium.

Other objects and advantages of the present invention will appear in the disclosure of the invention that follows.

The process of the present invention comprises the treatment of a glass article by contacting the glass with an alkali metal salt of one or more organic acids at an elevated temperature sufficiently high and for a period of time sufficient to ion exchange alkali metal ions of the salt of the organic acid with different alkali metal ions in the glass.

The alkali metal salts are salts of organic acids, such as carboxylic acids and sulfonic acids. The carboxylic acids can be, e.g., aliphatic acids having 1 to 22 carbon atoms, e.g., formic acid, acetic acid, propionic acid, caproic acid, neodecanoic acid and stearic acid, aromatic carboxylic acids, such as benzoic acid and toluic acid, and naphthenic acids. Examples of sulfonic acids are ethane sulfonic acid, benzene sulfonic acid, toluene sulfonic acid and those two classes of sulfonic acids obtained by sulfuric acid treatment of hydrocarbon oils, e.g., in the manufacture of water-white mineral oil. The two classes are in their sodium salt form know as water-soluble sulfonate soap and oil-soluble-sulfonate soap. When the organic acid has a relatively large number of carbon atoms the thermal stability is less than the organic acids having a small number of carbon atoms so that the use of the higher molecular weight acids is limited to lower temperatures or for a decreased period of time. It is preferred that the alkali metal salt be one of acetic acid.

It is further preferred that the salt be used with an organic vehicle. The organic vehicle is preferably a non-polar, non-ionic compound or mixture of such compounds. The organic vehicle is used with the alkali metal salt of the organic acid dispersed in it or dissolved in it, depending upon the organic compound and salt that are chosen. The organic vehicle is liquid at a temperature substantially below 200° C. and is liquid at the ion exchange process temperature at least under superatmospheric pressure, preferably provided by nitrogen or other inert gas. Suitable vehicles should be at most only partially decomposed during the ion exchange treatment. Non-polar organic compounds are preferred. Examples of suitable vehicles are paraffinic hydrocarbon oils, paraffin wax or wax fractions having relatively high melting points, i.e., above 150° F., aromatic polynuclear hydrocarbons including diphenyl, and aromatic ethers such as diphenyl oxide and, of course, compatible mixtures such as the eutectic mixture of diphenyl and diphenyl oxide.

The alkali metal salt of an organic acid alone or in the organic vehicle is used at an elevated temperature, between about 200 and 550° C. (between about 380 and 1000° F.), preferably between about 300 and 430° C. (between about 570 and 800° F.). Using sodium acetate or potassium acetate with the organic vehicle at about 700 to 750° F., about 3 to 5 hours contact will give a layer not substantially affected by the abrasion test. The length of time in which there is contact with a glass surface for ion exchange is dependent upon: (1) the temperature; (2) the type of ion exchange that is, whether a smaller or larger alkali metal ion is being displaced from the glass surface portion; (3) the composition of the glass; (4) whether it is a glass-ceramic; and (5) the depth of the surface layer in which the ion exchange is to be accomplished. Accordingly, the time can be as short as a few minutes or it can be carried out for a substantial number of hours, e.g., 10 hours. Also the time is determined to some extent by the degree of dilution, if any, of the alkali metal salt of the organic acid afforded by the organic vehicle. Surprisingly, in the case where the alkali metal salt of the organic acid is not very soluble or dispersable in the organic vehicle at the temperature used for ion exchange, good ion exchange can be obtained by contacting the organic vehicle containing this small amount of salt therein with the glass at the ion exchange temperature. For example, sodium and potassium acetates are almost insoluble or nondispersable in paraffinic hydrocarbon oil and paraffin wax. At 380° C. each of these acetates in a vessel with the oil or wax will be present as a lower separate heavier liquid phase. The alkali metal acetate content in the oil or molten wax will be below 0.1% by weight when 10 parts of the acetate is at 380° C. in a vessel also containing 90 parts of either organic vehicle. It is preferred that the overall content in the treating vessel comprise at least 1% by weight of alkali metal acetate and the balance being essentially the organic vehicle.

There is a distinct advantage in the use of the combination of the organic vehicle and the alkali metal salt of an organic acid that is only very slightly soluble or dispersable in the organic vehicle at the elevated temperature used for ion exchange. After the exchange, the organic vehicle now contains organic acids as salts of two alkali metal ions, the new ion being that displaced from the glass and replacing that part of the initial alkali metal ion now in the glass apparently on an equimolar basis. The vehicle is now contaminated or poisoned with the new ion insofar as further suitable use is concerned. However, the vehicle after separation from liquid alkali metal salt, if present as another lower liquid phase, is cooled to a temperature (which may be below 100° C.) at which the mixture of alkali metal salts will crystallize out of the vehicle. After filtration, the filtrate, i.e., organic vehicle can be reused.

The following examples illustrate the preferred embodiment of the present invention using the three types of glass as the term has been defined above. Gobs of glass obtained from a furnace melt, were remelted in a platinum pot. Glass cane was pulled from this molten glass and 5-inch long sample rods were made from the cane by cutting. The sample rods had a diameter of about 3/16 inch. Some of the sample rods were tested for flexural strength, with or without an abrasion. Other sample rods were ion exchanged by the process of the present invention, followed by gradual cooling to avoid the creation of thermal stress, which itself increases glass strength, and then followed by non-abrasive removal of all coating, i.e., oil and salt, on the glass of the treating medium. In Example I, because the glass is the type that is controllably crystallized by a heat treatment; some of its sample rods were converted to glass-ceramics prior to the ion exchange treatment.

The abrasion of rods comprised tumbling them for 15 minutes in a ball mill containing No. 30 silicon carbide grit.

The flexural strengths or modulus of rupture were determined using a Tinius-Olsen Testing Machine. This machine applies a measured load through a single knife edge to the center of a sample rod supported on two knife edges which are four inches apart (3-point loading). The load is applied at a constant rate of 24 lbs. per min. until failure occurs with a marker indicating the highest load applied to the point of failure. A dial micrometer calibrated in inches and equipped with a bore contact instead of a point contact is used to measure the maximum and minimum diameters at the center of the sample to an accuracy of 0.0005 inch. Since few sample rods are perfectly round, the load is applied normal to the maximum diameter and the standard formula for an elliptical cross-section is used in calculating the modulus of rupture as follows:

$$MR = \frac{(10.185) \times \text{Load}}{D_1^2 \times D_2}$$

The modulus of rupture in this formula gives the flexural strength in pounds per square inch of cross-sectional area at failure.

EXAMPLE I

A glass of the following analyzed composition in percent by weight was obtained by melting batch materials in a large continuous furnace:

| | |
|---|---|
| $SiO_2$ | 71.3 |
| $Al_2O_3$ | 17 |
| $TiO_2$ | 1.8 |
| $MgO$ | 4 |
| $Li_2O$ | 3.5 |
| $ZrO_2$ | 1.3 |
| $P_2O_5$ | 1.5 |
| $F_2$ | 0.1 |
| $As_2O_3$ | 0.2 |
| $Fe_2O_3$ | 0.03 |

This glass is very close to the composition of a glass shown on page 25 of the patent application Serial No. 352,958, now Patent No. 3,380,818, mentioned below, and the batch materials used were the same but the amounts differ slightly from those shown on page 24 of that application. The glass had a coefficient of thermal expansion of about $40 \times 10^{-7}/°$ C. The gobs of glass for the canes were obtained from the glass in the tank at the time that the glass had been cooled to about 2275° F. and then remelted in a platinum pot to obtain molten glass from which the cane was pulled. The heat treatment of some of the sample rods to provide a glass-ceramic was in accordance with the teaching of said patent application of William E. Smith, which is hereby incorporated by reference. The initial glass had an annealing point of about 1210° F. The rods of glass-ceramic that resulted from the heat treatment were slowly cooled to room temperature over a period of about four hours. This glass-ceramic had an average lineal coefficient of thermal expansion of about $6 \times 10^{-7}/°$ C.

Various mixtures of Duo-Seal pump oil and sodium acetate or paraffin and sodium acetate were heated in a vessel to about 720° F. Of course, at this temperature both were liquid with the pump oil or paraffin as a top layer and sodium acetate as a bottom layer, but with a small amount of sodium acetate in the pump oil or paraffin. The vessel was partially closed by a lid after sample rods of the glass and glass-ceramic were immersed in the oil or paraffin layer. The lid had a small hole in it for slow escape of decomposition vapors, but the lid provided a positive pressure by these vapors. The sample rods were kept in the vessel for various periods of time with the results tabulated below which show the flexural strength of untreated rods:

| | Glass Rods | | | | | | Glass-Ceramic Rods | | | | | |
|---|---|---|---|---|---|---|---|---|---|---|---|---|
| Immersion time, hrs | 3 | 3 | 3 | 3 | 4 | 5 | 3 | 3 | 3 | 3 | 4 | 5 |
| Sodium acetate wt. percent | 2.5 | 5 | 10 | 20 | 10 | 10 | 2.5 | 5 | 10 | 20 | 10 | 10 |
| Pump Oil wt. percent or paraffin | 97.5 | 95 | 90 | 80 | 90 | 90 | 97.5 | 95 | 90 | 80 | 90 | 90 |
| Unabraded strength [1] (p.s.i.)×10⁻³ | 16 | 40 | 52 | 52 | 57 | 56 | 71 | 24 | 42 | 52 | 52 | 60 | 70 | 76 |
| Abraded strength [1] (p.s.i.)×10⁻³ | 13 | 18 | 27 | 28 | 21 | 50 | 48 | 20 | 18 | 26 | 32 | 35 | 53 | 57 |
| Compressive layer average depth, microns | 105 | 98 | 88 | 110 | 124 | 132 | 11 | 16 | 22 | 21 | 30 | 22 |

[1] To obtain the strengths multiply the indicated numerical values by one thousand, e.g., 16 means a strength of 16,000.

It is seen from the foregoing data that the depth of the compressive stress surface layer may vary widely, e.g., from 10 to 200 microns and yet provide stronger unbraded products. For products subject to abrasion, the best products ordinarily must have other than a thin layer having compressive stress. The minimum value is dependent upon whether the glass has been previously crystallized, as can be seen from the data. For example, glass-ceramic when alkali metal ion is exchanged to a compressive stress layer of 30 microns will retain most of its improved strength upon abrasion, whereas more than 100 microns depth is required for the same glass composition in crystallizable form. In the case of the glass of Example III, 50 microns is an adequate depth.

The following indicates the reason that the present process can be less costly as regards material used. One hundred liters of sodium nitrate weighs 440 pounds and would cost $130, whereas the same volume based upon 10 parts by weight of sodium acetate and 90 parts by weight of paraffinic oil would cost $40.

EXAMPLE II

Glass rods were prepared from a soda-alumina-silica glass composition having the following ingredients in percent by weight:

| | |
|---|---|
| $SiO_2$ | 57.8 |
| $Al_2O_3$ | 12 |
| $Na_2O$ | 22.2 |
| $TiO_2$ | 8 |

This glass was made from batch materials and by melting in the conventional well-known manner for this type of glass. The glass had a coefficient of thermal expansion of about $95 \times 10^{-7}/°$ C. The glass rods were placed in a vessel in which had been placed 30 grams of potassium acetate per 500 cc. of melted paraffin wax. The following is a tabulation of the test results on the rods after immersion in the melted wax for 2½ hours at about 370° C. (about 700° F.)

Unabraded strength of the glass after the ion exchange was 36,000 p.s.i.

Unabraded strength of the glass without the ion exchange treatment was 12,000 p.s.i.

Depth of compression layer was 22 microns.

EXAMPLE III

The same procedure as used in Example II was duplicated using glass having the following composition in percent by weight:

| | |
|---|---|
| $SiO_2$ | 48 |
| $Al_2O_3$ | 26 |
| $Na_2O$ | 18 |
| $TiO_2$ | 8 |

The glass had a coefficient of thermal expansion of $93 \times 10^{-7}/°$ C. The sample rods were treated for 8 hours at 380° C. (about 720° F.) and tested and the results are reproduced below:

Strength of glass after ion exchange but before abrading was 69,000 p.s.i.

Strength of the ion-exchanged glass after abrasion was 48,000 p.s.i.

Depth of compression layer was 50 microns.

Duo-Seal pump oil is sold by The Welch Scientific Co., Skokie, Ill. for use with vacuum pumps. It is a hydrocarbon oil made for Welch to meet its specifications that are as follows:

Vapor pressure at 50° C. of 0.00001 mm. of mercury
A.P.I. density of 29.3°
Color, N.P.A. of 4.5
Viscosity, S.S.U. at 100° F., 305–325
Viscosity, S.S.U. at 210° F., of 54
Viscosity index (Dean & Davis) of 95
Flash point of 410° F.
Fire point of 465° F.
Pour point of 20° F.
Inhibitors—none The paraffin wax used in Example I through III is Sunoco 5512 having a melting point of greater than 150° F. It is sold by Sun Oil Company. It is a narrow boiling range fraction obtained by fractional distillation of paraffin wax obtained in the dewaxing of a motor oil fraction of crude oil.

The present invention is not limited to the specific glass compositions; including the specific glass-ceramic, of the foregoing examples. They illustrate the invention not only for the types of glasses of which they may be considered typical and also illustrate the suitability of the invention to many types of glass that heretofore have been ion exchanged using alkali metal salts of inorganic acids and other types especially silicate glasses containing alkali metal ions capable of ion exchanging.

W. A. Weyl and E. C. Marboe in their book entitled "The Constitution of Glass," volume II, part one, published in 1964 by Interscience Publishers, a division of John Wiley & Son, Inc., New York, N. Y., presents information regarding many types of representative inorganic glasses. A number of these types of inorganic glasses are not the glass used in the present invention, because they do not contain alkali metal oxide and thus are not useful in the present invention which requires an alkali metal oxide, i.e., an alkali metal bonded through oxygen to the basic glass forming structure. The representative glasses useful in the present invention are the alkali metal silicate glasses, the alkali metal silicates containing alkaline earth oxide or oxides in substantial amount, which Weyl and Marboe refer to as alkali-alkaline earth silicates, alkali aluminosilicates, and alkali borosilicates. Other silicate glasses useful in the present invention include alkali metal oxide-zironica-silica glasses, alkali metal oxide-titania-silica glasses as well as lead-alkali silicate glasses that are referred to on page 4 of the book by E. B. Shand entitled "Glass Engineering Handbook," second edition, published in 1958 by McGraw-Hill Book Company, Inc., New York, N. Y. Some of the phosphate glasses contain alkali metal oxide, as can be seen from page 581 of the book by Weyl and Marboe mentioned above and such glasses may be treated by the process of the present invention to form articles of this invention.

It is seen from the foregoing that there are many types of silicate glasses that contain silica and alkali metal oxide. Some contain one or more other oxides that are real or probable glass formers and some contain other oxides as glass modifiers, as these terms are used by Weyl and Marboe. Such chemical elements are shown in Table XXII on page 225 of volume I (published in 1962) of their book mentioned above. Some contain both other glass formers and other glass modifiers. These silicate glasses containing alkali metal oxide have compositions that contain the following components in the indicated weight percent ranges:

| | Percent by wt. |
|---|---|
| $SiO_2$ | 35–88 |
| $M_2O$ | 1–48 |
| $Al_2O_3$ | 0–40 |
| $CaO$ | 0–15 |
| $MgO$ | 0–28 |
| $BaO$ | 0–15 |
| $SrO$ | 0–15 |
| $B_2O_3$ | 0–15 |
| $ZrO_2$ | 0–25 |
| $TiO_2$ | 0–12 |
| $SnO_2$ | 0–2 |
| $P_2O_5$ | 0–10 |
| $As_2O_5$ | 0–3 |
| $Sb_2O_5$ | 0–3 | wherein $M_2O$ refers to the total of alkali metal oxide and, when the alkali metal oxide is lithium oxide, potassium oxide, rubidium oxide or cesium oxide, it constitutes a maximum of about 25% by weight of the glass composition. The content of alkali metal oxide to be at least partially replaced in a surface layer by another alkali metal oxide preferably constitutes at least 2% and for glasses, other than glass-ceramics, it is especially preferred that it constitutes at least 5%.

For those glass compositions that are thermally crystallizable to form glass-ceramics, antimony oxide or arsenic oxide is part of the batch material to form the glass. Up to about 1% by weight of either or total of both is used. They are used as fining agent or oxidizing agent. Most of these oxides are lost by vaporization in the glass-making furnace so that the final glass composition will actually contain at most only a few tenths of one percent. When arsenic oxide is used as fining agent there is commonly used also, in the batch, a small amount of sodium nitrate, but it is not shown.

Fluorine as a salt is commonly used in batch material as an additive in an amount usually not exceeding 0.3% by weight in the final composition. Fluorine is believed to aid crystallization; but its content of the composition is limited to a low value, because it accelerates the crystallization, sometimes with an undesirable exothermic effect.

Within this glass composition, it will be apparent to one skilled in the art that there are narrower limits to the ranges of the individual oxides depending upon which ones are present to form a compatible mixture as a melt that when cooled will be a glass. These glasses are per se no part of the present invention. Instead, they are the materials that are treated by the process of this invention to form the improved glass articles. However, various classes of glasses within this broad type are presented below for purpose of illustrating the cited variation of glasses useful in the present invention.

The simplest silicate glass containing alkali metal oxide is the binary type. As pointed out on page 17 of the book entitled 'Glass-Ceramics" by P. W. McMillan published in 1964 as a U.S. edition by Academic Press Inc., New York, N.Y., two-component glasses can be prepared for combinations of alkali metal oxides with either silica, boric oxide or phosphorus pentoxide. In the case of silica, there is a limitation on the maximum mole percent of alkali metal oxide as follows: 40% for lithium oxide; 47% for sodium oxide and 50% for potassium oxide. At a higher alkali metal oxide content there will be crystallization or divitrification during cooling of the melt. Replacement of part of one alkali metal by another in such binary glasses, in accordance with the process of the present invention usually would require temperature and time factors economically unfeasible at the present time. Furthermore, mixtures of alkali metal oxides in alkali metal oxide-silica binary glasses have expansion coefficients that show a maximum for a specific ratio and partial exchange of one alkali metal for another could result in no strengthening of the glass. Again it is apparent that the mole percent of silica should not be too high or too low, at least in the case of substitution of potassium for sodium. Such expansion coefficients are shown in Table LII on page 496 of the book by Weyl and Marboe mentioned above.

In view of the foregoing relating to a binary system, the preferred glasses used in the present invention are those containing other metal oxides and/or other glass network formers in addition to alkali metal oxide and silica. The following presents various examples of multicomponent glass systems.

One example is the class of glasses composed of silica, one or more alkali metal oxide, and one or more alkaline earth metal oxide. A common glass representative of this class is the alkali-lime-silica glass, such as used for window sheet glass, plate glass and container glass. In these commercial glasses the alkaline earth metal oxide content is usually lime or a mixture of calcia and magnesia such as is present in a dolomitic lime. The approximate composition of such commercial glasses on a weight basis is as follows: 70–74% silica, 12–16% soda, either 10–13% calcia and magnesia total or 8–12% calcia and 1–4% magnesia. Alumina is present in about 0.5–1.5% by weight for sheet and plate glass while for container glass it is usually 1.5–2.5%, but in some cases exceeds 5%. This glass with the low alumina content can be ion exchanged to improve its strength but upon abrasion most, if not all, of the increased strength is lost and thus the ion exchange treatment is suitable only when the product is not subjected to abrasion during its use. However, as disclosed and claimed by William E. Smith in a patent application with common assignee, that is being filed concurrently with this application, it is possible to provide an alkali metal oxide-alkaline earth metal oxide-silica glass, containing such small amount of alumina or containing no alumina, that by ion exchange has an improved strength, even after a substantial degree of abrasion. The glass compositions and range of glass composition disclosed in said application of William E. Smith are hereby incorporated by reference.

Another class of glasses within the broad type of alkali metal silicate glasses is the lead-alkali metal silicate glass, in which the alkali metal oxide is potassium oxide alone or with soda, i.e., sodium oxide, as shown in Table I–1 on page 4 of Shand's book mentioned above. Similarly, another class of glasses is the borosilicate glass system which is illustratetd by glasses numbers 10, 11 and 12 in Table I–1.

Another class of glasses useful in the present invention is the alkali aluminosilicate glass compositions which are disclosed in U.S. Patent application Ser. No. 181,887 filed Mar. 23, 1962, now abandoned, on which French Patent No. 1,329,124 and South African Patent No. 62/2353 are based in part. This U.S. application discloses as the broad range for such composition on a weight basis: 50–75% silica; at least 5% and preferably from 10–25% alumina; and at least 5%, preferably 10–25%, Na$_2$O, with the alumina and Na$_2$O content preferably constituting at least 15% of the glass composition and with these two plus the silica constituting at least 85% of the glass composition. It is indicated that divalent metal oxides, potassium oxide, boron oxide, titania, phosphorus pentoxide and fluorine may be present up to a maximum individual content of 10% and collectively up to a maximum of 15%. It is also stated that lithium oxide may be present but should not exceed 1%. Because some of these limitations are based upon the attaining of the high strength even after abrasion, such limitation, although preferred, is not a limitation on the present invention.

Another class of glasses of the broad alkali metal oxide-silica type is the lithium silicate glass described in U.S. patent application Ser. No. 181,886 filed Mar. 23, 1962, on which French Patent No. 1,329,125 and South African Patent No. 62/2352 are based. The U.S. application discloses that this glass contains on a weight basis 46–88% silica and 4–29% lithia. This glass may contain alumina to constitute the remainder, if any, but the ratio of silica to alumina should be at least 2:1. Thus it is seen that this class of glasses can be the binary type mentioned above, but when alumina is present it is the alkali metal aluminosilicate also mentioned above. Instead of alumina, or for part of it, there may be present one or more of the following constituents: zirconia; titania; and boron oxide. In addition other alkali metal oxides, namely, sodium oxide and potassium oxide, may be present along with lead oxide (PbO) and fluorine up to a total of 15 mole percent. Of course, some of these limitations relate to the compositions which provide the maximum mechanical strength after abrasion, but such is not a limitation for the present invention in its broadest sense.

A further class of glasses that contain ion exchangeable alkali metal ions in the glass composition disclosed in U.S. patent application Ser. No. 181,888 filed Mar. 23, 1962, now abandoned, on which French Patent No. 1,329,126 and South African Patent No. 62/2354 are based. In this U.S. application this glass composition is described as constituting at least 10%, preferably at least 20%, by weight of zirconia and the balance silica, except for lithia (lithium oxide), if present, which normally should not exceed 1% by weight and except for optional compatible ingredients including divalent metal or oxides, potassium oxide, boron oxide, phosphorus pentoxide, titania and fluorine which individually may be present in an amount up to 10 percent by weight and collectively may be present in an amount up to 15% by weight. In the ternary glass system the composition can be, e.g., 60 to 75% by weight of silica, 5 to 20% by weight of zirconia and 20% by weight of sodium oxide. Again some of these limitations, not relating to glass forming are not precise limitations relative to the present invention.

U.S. patent application Ser. No. 228,255 filed Oct. 4, 1962, now Patent No. 3,287,200, on which French Patent No. 1,375,995 is based discloses that alkali-alkaline earth metal silicate glasses, which may contain alumina, boron oxide and various compatible inorganic oxides, can be ion exchanged using alkali metal salts. These glasses contain by weight in excess of 40%, e.g., 65–75% silica, 0–15% boron oxide, 0–35% alumina, 0–25% calcium oxide, magnesia, strontia, barium oxide, lead oxide and/or zinc oxide and combinations thereof, 0–10% titania, 0–10% potassium oxide and 2–20% sodium oxide and/or lithium oxide. Typical glass compositions are described and these are ion exchanged for strengthening of the glass.

U.S. patent application Ser. No. 249,790 filed Jan. 7, 1963, now Patent No. 3,287,201, on which South African Patent No. 63/5619 is based in part, discloses glass compositions, similar to those in the foregoing U.S. application on which French Patent No. 1,375,995, as capable of ion exchange. These compositions contain by weight 65–75% silica, 10–20% sodium oxide, 0–5% potassium oxide, 3–15% calcium oxide, 0–10% magnesia, 0–5% alumina and 0–5% barium oxide. Some of the sodium oxide can be replaced by additional potassium oxide.

U.S. patent application Ser. No. 252,324 filed Jan.

18, 1963, now abandoned, on which South African Patent No. 63/5747 is based in part, discloses another class of glass compositions which are alkali silicates that contain magnesia and/or zinc oxide, with or without alumina. In these compositions alkaline earth metal oxides may be absent. These glasses are stated as containing by weight in excess of 40%, e.g., 55–75% silica, 0–40% alumina, 0–25% calcium oxide, magnesia, strontia, barium oxide, lead oxide and/or zinc oxide and combinations thereof, 0–10% titania, 0–10% potassium oxide, and 2–20% sodium oxide and/or lithium oxide. A representative range for such glass composition is as follows:

| | Percent by wt. |
|---|---|
| $SiO_2$ | 55–70 |
| $Al_2O_3$ | 1–30 |
| MgO and/or ZnO | 3–10 |
| $Li_2O$ | 2–8 |
| $Na_2O$ | 4–8 |
| $K_2O$ | 0–2 |

U.S. patent application Ser. No. 264,708 filed Mar. 12, 1963, now abandoned, on which South African Patent No. 63/5619 is based in part relates to similar glass compositions that required to be lithia-containing. A representative range for such glass compositions is as follows:

| | Percent by wt. |
|---|---|
| $SiO_2$ | 55–75 |
| $Li_2O$ | 3–20 |
| $Na_2O$ (when present) | 1–22 |
| $K_2O$ | 0–5 |
| $Al_2O_3$ (when present) | 10–30 |
| MgO and/or ZnO | 0–5 |
| $ZrO_2$ (when present) | 3–20 |
| $Al_2O_3$ and $ZrO_2$ | 13–33 | with mole ratio of $Li_2O:Na_2O$ between 0.2:1 to 5:1 and fluorine as fining agent is present when alumina is present. In addition to the above oxides, such glasses can contain by weight: 0–10% titania; 0–3% barium oxide and/or lead oxide; and 0–1% $Sb_2O_3$, $As_2O_3$, phosphorus pentoxide and fluorine. Calcium oxide in an unstated amount may be present. Usually when both lithia and soda are present, their combined total ranges from 5–25% by weight.

All of the foregoing classes of glasses are the first of the three types of glasses mentioned above in the foregoing definition of the term "glass." The glass compositions of the second and third types, under that definition, are described below but some of them as glass-ceramics, at least resulting from a specific heat treatment may not be ion exchanged, although they are ion exchanged as the thermally crystallizable glass composition. This limitation is not peculiar to the present process. Instead it has been discovered as a limitation when using the conventional ion exchange process that utilizes a molten alkali metal nitrate.

The glass-ceramics preferably used in the present invention are opaque or translucent. Especially preferred are the opaque glass-ceramics which contain a multiplicity of crystals in a glassy matrix wherein the average diameter of the individual opaque crystals is less than about 30 microns across the largest dimension. The average lineal coefficient of thermal expansion of these opaque glass-ceramics is generally less than about $20 \times 10^{-7}/°$ C. (between 25° C. and 300° C.)

Examples of thermally crystallizable silicate glass compositions are given in U.S. Patent No. 2,920,971. On the basis of the actual contents of various ingredients of these glasses presented in that patent the range of the compositions is as follows:

| | Percent by wt. |
|---|---|
| $SiO_2$ | 56.1–73.1 |
| $Al_2O_3$ | 12.1–15.3 |
| $Li_2O$ | 3.0–5.2 |
| $Na_2O$ | 0–1.7 |
| $K_2O$ | 0–0.2 |
| CaO | 0–11.1 |
| MgO | 0–8.8 |
| $TiO_2$ | 4.5–13.8 |
| $ZrO_2$ | 0–3.9 |

In some of these compositions fluorine is present as a fining agent. These compositions after controlled thermal crystallization are glass-ceramics and some of these, provided there is suitable heat treatment, are capable of ion exchanging lithium in the glass-ceramic with an alkali metal in an inorganic salt bath and thus capable of being ion exchanged by the method of the present invention.

U.S. Patent No. 3,157,522 discloses a class of glass and glass-ceramic therefrom. The range for the composition is as follows:

| | Percent by wt. |
|---|---|
| $SiO_2$ | 55–75 |
| $Al_2O_3$ | 12–36 |
| $Li_2O$ | 2–15 |
| $TiO_2$ | 3–7 |
| $SiO_2$ and $TiO_2$ | 58–82 | with the recited ingredients constituting at least 95% of the composition and the weight ratio of $Li_2O:Al_2O_3$ being between 0.1:1 and 0.6:1.

Another class of thermally crystallizable glass composition that can be ion exchanged in the glass form and by proper heat treatment can be exchanged as a glass-ceramic is disclosed in Japanese patent Showa 37–15320 filed Sept. 27, 1962. The range of this composition is as follows:

| | Percent by wt. |
|---|---|
| $SiO_2$ | 48–73 |
| $Al_2O_3$ | 14–35 |
| $Li_2O$ | 4–10 |
| $ZrO_2$ | 2–6 | and wherein the sum of recited ingredients, other than zirconia, is greater than 85% of the composition.

Belgian Patent No. 609,529 describes another thermally crystallizable glass composition having the following composition:

| | Percent by wt. |
|---|---|
| $SiO_2$ | 48–73 |
| $Al_2O_3$ | 14–25 |
| $Li_2O$ | 4–10 |
| $TiO_2$ | 0–1.8 |
| $ZrO_2$ | 2–6 | wherein the total of the recited ingredients, other than titania and zirconia, constitutes at least 85% of the glass. Many of the specific compositions that are disclosed contain 3% by weight of $B_2O^3$.

Belgian Patent No. 633,889 discloses thermally crystallizable glass compositions and glass-ceramics therefrom, both of which can be ion exchanged to replace one alkali metal ion by another. Such compositions contain silica, alumina, lithium oxide, boron oxide and 3–7% by weight of MgO and/or ZnO plus a small quantity of a nucleating agent. The typical composition range indicates that the silica content would be 55–66% by weight, the alumina content would be 13–22% by weight and the lithium oxide content would be 2.5–5% by weight.

Another class of thermally crystallizable glass compositions that is ion exchangeable is disclosed in U.S. Patent No. 3,170,805 in which the major constituents are silica, lithium oxide and zinc oxide in the weight percent ranges of 34–81, 2–27 and 10–59, respectively. Other constituents may be present as indicated, and $P_2O_5$ in the amount of 0.5–6% by weight where metallic nucleating agents are used.

Thermally crystallizable glass compositions and glass-ceramics therefrom are disclosed in U.S. patent application Ser. No. 464,147, filed June 15, 1965, by Clarence L. Babcock, Robert A. Busdiecker and Erwin C. Hagedorn, with common assignee entitled "Product and Process for Forming Same." This class of glass composition contains the following ingredients:

| | Percent by wt. |
|---|---|
| $SiO_2$ | 50–75 |
| $Al_2O_3$ | 16–35 |
| $Li_2O$ | 3–5.5 |
| Nucleating agent | Variable |
| $Li_2O$ and nucleating agent | At least 5.5 |

The amount of nucleating agent, such as titania and method of manufacture of the glass, the heat treatment of the glass to obtain glass-ceramics, are hereby incorporated by reference.

The amount of nucleating agent, such as titania and zirconia, depends upon the particular composition and the particular nucleating agent or combination of nucleating agents, etc. Metal oxides as colorants may be present in an amount of 0.005–2% by weight. To provide lower expansion characteristics to the glass-ceramic that can be formed from the glass composition, the components are as follows:

| | Percent by wt. |
|---|---|
| $SiO_2$ | 56–68 |
| $Al_2O_3$ | 18–27 |
| $Li_2O$ | 3.4–4.5 |
| $CaO$ | 0–3 |
| $ZnO$ | 0–2 |
| $B_2O_3$ | 0–4 |
| $TiO_2$ | 0–6 |
| $ZrO_2$ | 0–3 |
| $MgO$ | 0–3 |
| $Na_2O$ | 0–1 |
| $P_2O_5$ | 0–3 |
| ($SiO_2$ and $Al_2O_3$) | At least 82 |
| ($SiO_2$, $Al_2O_3$, $B_2O_3$ and $P_2O_5$) | 86–91 |
| ($CaO$, $MgO$, $ZnO$ and $Na_2O$) | 2.5–6 |
| ($SiO_2$, $Al_2O_3$, $P_2O_5$ and $Li_2O$) | No more than 93. |
| $TiO_2$ and $ZrO_2$ | 2–6 | where the ratio of ($CaO$, $MgO$, $ZnO$, $Na_2O$, and $B_2O_3$) to $Li_2O$ is less than 2.4 and the ratio of $SiO_2$ to $Al_2O_3$ is no more than 3.3 and preferably no more than 3.8.

Another class of glass compositions as thermally crystallizable glass and glass-ceramics is the subject of U.S. patent application Ser. No. 352,958 filed on Mar. 18, 1964, now Patent No. 3,380,818 by William E. Smith, with common assignee and entitled "Glass, Ceramics and Method." The composition consists essentially of the following:

| | Percent by wt. |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–<1.9 |
| $SnO_2$ | 0–1.7 |
| $P_2O_5$ | 0–3 |
| $BaO$ | 0–5 |
| $ZnO$ | 0–3 |

$P_2O_5$ is at least 2.8, and the total weight percent $Li_2O$ and where the total weight percent of $ZrO_2$, $TiO_2$, $SnO_2$ and $MgO$ is 6.3 to 10.5.

The glass compositions of the U.S. patent applications that are presented in the paragraphs immediately preceding form glass-ceramics containing beta-eucryptite and/or beta-spodumene. Glass compositions have been developed for thermally crystallizable glass-ceramics in which the crystals or crystallites or other materials including those in which the crystalline phase is nepheline. Such glass compositions at least as a thermally crystallizable glass can be ion exchanged. One class of such compositions is disclosed and claimed in U.S. patent application Ser. No. 371,089 filed May 28, 1964 by William E. Smith, with common assignee entitled "Glass, Ceramics and Method." This composition contains the following ingredients:

| | Percent by wt. |
|---|---|
| $SiO_2$ | 44–52 |
| $Al_2O_3$ | 22–29 |
| $Na_2O$ | 15–22 |
| $TiO_2$ | 6–12 |
| $K_2O$ | 0–3 |
| $SiO_2$ and $Al_2O_3$ | 69–76 |
| $Na_2O$ and $K_2O$ | 17–22 | where the weight ratio of $SiO_2$ to ($Na_2O$ and $K_2O$) is between 2.1 and 3, and the mole ratio of ($Na_2O$ and $K_2O$) to $Al_2O_3$ is at least 1.02. The usually preferred $Na_2O$ range is 16–21% by weight. The disclosure in the application of batch materials and method of manufacture of the glass, the heat treatments of the glass to obtain glass-ceramics, are hereby incorporated by reference.

Another class of glass compositions that form nepheline as a crystal phase in a glass-ceramic contains the following ingredients:

| | Percent by wt. |
|---|---|
| $SiO_2$ | 45–57 |
| $Al_2O_3$ | 29–38 |
| $Na_2O$ | 13–22 |
| $TiO_2$ | [1] 1–3 |
| $ZrO_2$ | [1] 1–4 |
| $BrO$ | [1] 2–14 |
| $SiO_2$, $Al_2O_3$ and $Na_2O$ | At least 95. |

[1] In excess over 100% of the sum of $SiO_2$, $Al_2O_3$ and $Na_2O$.

$Li_2O$, $K_2O$, $P_2O_5$ and bivalent metal oxides may be present in total less than 5%.

British Patent No. 869,328 discloses glass compositions that can be ion exchanged by replacing an alkali metal ion. Such a glass system contains sodium oxide, alumina and silica with titania as a nucleating agent in combination with one or more other agents. The $Na_2O$ content is 7–34 mole percent. Metal oxides used in combination with titania are listed in the British patent and it is indicated that they must constitute at least 1.9 mole percent in excess of the total moles of silica, alumina, sodium oxide, potasium oxide and calcium oxide in the glass composition to provide a controlled thermally crystallizable glass. When crystallized the glass-ceramic contains a nepheline crystal phase.

The term "strain point" is defined on page 659 of the book by Weyl and Marboe mentioned above and in U.S. Patent No. 2,779,136.

We claim:

1. A process for treating an inorganic article, containing at least about 1% by weight of an alkali metal oxide, of the group consisting of an inorganic glass and a glass-ceramic, the process comprising (1) contacting a surface of said article with a liquid medium containing a different alkali metal as a salt of an organic acid containing 1 to 22 carbon atoms as a minor constituent and a non-polar, non-ionic organic vehicle in an amount of at least about 80% as a major constituent, in which major constituent said different alkali metal salt of an organic acid is only slightly soluble, at an elevated temperature of about 200 to 550° C., but below the strain point of the article and for a period of time sufficient for exchange of said alkali metal in a surface layer only with said different alkali metal in said salt of an organic acid, (2) separating the article and the salt, and (3) cooling the article.

2. The process of claim 1 wherein the organic acid is acetic acid.

3. The process of claim 1 in which said salt is sodium acetate, said alkali metal in said article is lithium.

4. A process for treating an inorganic article of the group consisting of a glass and a glass-ceramic, the article containing as its ingredients the following in weight percent ranges

| | |
|---|---|
| $SiO_2$ | 35–88 |
| $M_2O$ | 1–48 |
| $Al_2O_3$ | 0–40 |
| $CaO$ | 0–15 |
| $MgO$ | 0–28 |
| $BaO$ | 0–15 |
| $SrO$ | 0–15 |
| $B_2O_3$ | 0–15 |
| $ZrO_2$ | 0–25 |
| $TiO_2$ | 0–12 |
| $SnO_2$ | 0–2 |
| $P_2O_5$ | 0–10 |
| $As_2O_5$ | 0–3 |
| $Sb_2O_5$ | 0–3 | wherein $M_2O$ refers to the total of alkali metal oxide, which process comprises immersing for a period of time the article in a liquid body of a non-polar, non-ionizing organic vehicle as a major constituent containing as a minor percentage at least 1%, but less than 20% by weight thereof of an alkali metal salt of acetic acid which salt is only slightly soluble in said major constituent, while maintaining said bodies at an elevated temperature of about 300 to 430° C. which is below the strain point of the article, said alkali metal of the salt being a different chemical element than the alkali metal present in the article, and said temperature and time being sufficient for ion-exhange by said different chemical elements to occur between a surface layer only of said article and said salt of acetic acid in said liquid body of an organic vehicle, removing the article, and removing any adhering organic vehicle and salt.

5. The process of claim 4 wherein said organic vehicle is a paraffinic hydrocarbon oil, the salt is a sodium salt, the different alkali metal in the article is lithium, and the article is an opaque glass-ceramic containing a multiplicity of crystals, each being less than 30 microns across its largest dimension, and having an average lineal coefficient of thermal expansion that is less than about $20 \times 10^{-7}$ per °C. (between 25° C. and 300° C.).

6. A process as defined in claim 4 in which the organic vehicle is a paraffin wax, the alkali metal salt is sodium acetate, and the different alkali metal in the glass is lithium.

References Cited
UNITED STATES PATENTS

| | | | |
|---|---|---|---|
| 1,791,066 | 2/1931 | Smith | 65–30 |
| 2,647,068 | 7/1953 | Patai | 117–35 |
| 2,779,136 | 1/1957 | Hood et al. | 65—51 |
| 3,063,788 | 11/1962 | Veazie | 18—54 |
| 3,357,876 | 12/1967 | Rinehart | 161—1 |

OTHER REFERENCES

Kistler, S. S.: "Stresses in Glass Produced by non-uniform Exchange of Monovalent Ions," J. of Amer. Cer. Soc., February 1962 vol. 45, No. 2, pp. 59–68.

S. LEON BASHORE, Primary Examiner

JOHN H. HARMAN, Assistant Examiner

U.S. Cl. X.R.

117—124